United States Patent
Farrell et al.

(10) Patent No.: US 8,561,786 B2
(45) Date of Patent: Oct. 22, 2013

(54) CONVEYOR SYSTEM SUPPORT HANGER ASSEMBLY

(71) Applicant: Wheelabrator Group, Inc., Golden, CO (US)

(72) Inventors: Jeffrey Cecil Farrell, Brampton (CA); Shawn Douglas McBride, Grimsby (CA)

(73) Assignee: Wheelabrator Group, Inc., Golden, CO (US)

( * ) Notice: Subject to any disclaimer, the term of this patent is extended or adjusted under 35 U.S.C. 154(b) by 0 days.

(21) Appl. No.: 13/849,682

(22) Filed: Mar. 25, 2013

(65) Prior Publication Data

US 2013/0213772 A1     Aug. 22, 2013

Related U.S. Application Data

(63) Continuation of application No. 13/085,960, filed on Apr. 13, 2011, now Pat. No. 8,403,128.

(51) Int. Cl.
*B65G 33/32*     (2006.01)

(52) U.S. Cl.
USPC .......................................... 198/666; 198/673

(58) Field of Classification Search
USPC .......... 198/657, 659, 666, 672, 673; 384/252, 384/257, 260
See application file for complete search history.

(56) References Cited

U.S. PATENT DOCUMENTS

| | | | |
|---|---|---|---|
| 1,729,211 A * | 9/1929 | Erisman | 198/666 |
| 3,133,625 A | 5/1964 | Best | |
| 3,144,125 A | 8/1964 | Medley | |
| 3,189,168 A * | 6/1965 | Coats et al. | 198/667 |
| 3,272,317 A | 9/1966 | Kelly | |
| 3,289,819 A | 12/1966 | Steinmetz | |
| 3,865,444 A | 2/1975 | Lavoie | |
| 3,934,374 A | 1/1976 | Leliaert | |
| 4,077,508 A | 3/1978 | Pedersen | |
| 4,220,242 A | 9/1980 | Forsberg | |
| 4,424,046 A | 1/1984 | Ziegler | |

(Continued)

FOREIGN PATENT DOCUMENTS

| CA | 2 288 325 C | 5/2001 |
|---|---|---|
| GB | 1 514 340 A | 6/1978 |

OTHER PUBLICATIONS

International Search Report for PCT/US2012/032106 mailed Jun. 27, 2012.

*Primary Examiner* — James R Bidwell
(74) *Attorney, Agent, or Firm* — Lando & Anastasi, LLP

(57) ABSTRACT

A screw conveyor to move media includes a first feed screw having a first end portion, a second feed screw having a second end portion, and a support hanger assembly to support the first feed screw and the second feed screw. The support hanger assembly includes a hanger bracket having a vertical support member and an inner hub secured to and extending perpendicularly from the vertical support member, a shaft portion disposed within the inner hub, an inner sleeve configured to be disposed between the shaft portion and the inner hub, at least one outer hub coupled to the shaft portion, and an outer sleeve configured to be disposed between the inner hub and the at least one outer hub. The first feed screw and the second feed screw are coupled to the at least one outer hub. The inner sleeve and/or the outer sleeve may be fabricated from low coefficient of friction material.

19 Claims, 7 Drawing Sheets

(56) References Cited

U.S. PATENT DOCUMENTS

| | | |
|---|---|---|
| 4,627,885 A | 12/1986 | Arlt |
| 4,645,067 A | 2/1987 | George |
| 5,222,591 A | 6/1993 | Bertola et al. |
| 5,875,882 A | 3/1999 | Pollock |
| 6,398,012 B1 | 6/2002 | Volpe |
| 6,951,273 B2 | 10/2005 | Bass |
| 7,192,094 B2 | 3/2007 | Kelm |
| 8,136,654 B2 | 3/2012 | Moreland et al. |
| 8,267,240 B2 | 9/2012 | Moreland et al. |
| 8,403,128 B2 * | 3/2013 | Farrell et al. ............ 198/672 |

* cited by examiner

CONVEYOR SYSTEM SUPPORT HANGER ASSEMBLY

CROSS-REFERENCE TO RELATED APPLICATION

This patent application is a Continuation Patent Application of U.S. Ser. No. 13/085,960, entitled "CONVEYOR SYSTEM SUPPORT HANGER ASSEMBLY," filed on Apr. 13, 2011, which is hereby incorporated herein by reference in its entirety.

BACKGROUND OF THE DISCLOSURE

1. Field of the Disclosure

This disclosure relates generally to the field of media recovery systems for surface preparation equipment, such as shot blast equipment, and more particularly to support hangers for feed screw conveyors used to transport media, such as steel shot, grit, sand, and the like, used in surface preparation equipment.

2. Discussion of Related Art

Media recovery systems are used to return media, such as shot, grit, sand, and the like, to surface preparation equipment, such as shot blast equipment. A typical recovery system includes feed screws or conveyors that receive used media to convey the used media back to the surface preparation equipment. The feed screw, which is disposed in a cylindrical casing or a facet trough made flat at the bottom with angled walls, may often carry the media a considerable distance. Thus, more than one feed screw may be needed. Support hanger bearings are often used to support sections of the feed screws having long distances of travel. Since such support hanger bearings are used in extremely abrasive environments, the support hanger bearing must be able to operate to ensure the continued rotation of the feed screw. The support hanger bearings are oftentimes considered to be the weak point of screw conveyor systems since the abrasive media can penetrate bearings used in such support hangers and compromise the useful life of the bearings.

Several known approaches for supporting feed screws are described in, for example, U.S. Pat. No. 3,934,374, entitled "Sand Reclamation System," U.S. Pat. No. 4,077,508, entitled "Sealed Hanger bearing for Use with Abrasive Conveyors," U.S. Pat. No. 4,220,242, entitled "Screw Conveyor with Intermediate Bearing," U.S. Pat. No. 4,424,046, entitled "Flexible Coupling;" U.S. Pat. No. 4,627,885, entitled "Method of Producing a Compression Loaded Torsional Coupling Device." U.S. Pat. No. 4,645,067, entitled "Screw Conveyor," U.S. Pat. No. 5,222,591, entitled "Rotary Pipe and Fixed Channel Auger with Intermediate Outer Supporting Elements;" and U.S. Pat. No. 6,398,012, entitled "Support and Coupling Assembly for Screw Conveyor."

SUMMARY OF THE DISCLOSURE

One aspect of the disclosure is directed to a screw conveyor for moving granular media. In one embodiment, the screw conveyor comprises a first feed screw including a first end portion, a second feed screw including a second end portion, and a support hanger assembly configured to support the first feed screw and the second feed screw at the respective first and second end portions of the first feed screw and the second feed screw. In a particular embodiment, the support hanger assembly includes a hanger bracket having a vertical support member and an inner hub secured to and extending perpendicularly from the vertical support member, a shaft portion disposed within the inner hub, an inner sleeve configured to be disposed between the shaft portion and the inner hub, at least one outer hub coupled to the shaft portion, and an outer sleeve configured to be disposed between the inner hub and the at least one outer hub. The first feed screw and the second feed screw are coupled to the at least one outer hub. The inner sleeve and/or the outer sleeve may be fabricated from low coefficient of friction material.

Embodiments of the screw conveyor may include configuring the at least one outer hub with a first outer hub and a second outer hub. Each of the first and second outer hubs may include a cylindrical portion and an annular end portion secured to an inner surface of the cylindrical portion. The annular end portions of the first and second outer hubs engage opposite ends of the shaft portion. Each end of the shaft portion may have a slot formed therein. Each of the first and second outer hubs may include a key configured to be received in the slot and secured to the respective annular end portion. The outer sleeve may include a first outer sleeve section configured to be disposed between the inner hub and the first outer hub and a second outer sleeve section configured to be disposed between the inner hub and the second outer hub. The inner and outer sleeves may be fabricated from ultra-high molecular weight polyethylene material. The inner hub may include a first inner hub portion extending from one side of the vertical support member and a second inner hub portion extending from an opposite side of the vertical support member. The first inner hub portion and the second inner hub portion may be aligned with one another to create a continuous inner surface defining an axial bore. The support hanger assembly may be configured to drive the rotation of the second feed screw when rotating the first feed screw. The screw conveyor may further comprise an upper hub and a lower hub configured to couple one of the first end portion of the first feed screw and the second end portion of the second feed screw to the at least one outer hub.

Another aspect of the disclosure is directed to a support hanger assembly configured to support first and second feed screws of a screw conveyor mechanism as described above.

Yet another aspect of the disclosure is directed to a method of supporting two feed screws of a screw conveyor mechanism. In one embodiment, the method comprises: securing a hanger bracket to a support structure, the hanger bracket having a vertical support member and an inner hub secured to and extending perpendicularly from the vertical support member; securing a first feed screw to a first outer hub; securing a second feed screw to a second outer hub; coupling the first outer hub and the second outer hub to a shaft portion disposed within the inner hub of the hanger bracket; positioning an inner sleeve fabricated from low coefficient of friction material between the shaft portion and the inner hub; positioning a first outer sleeve fabricated from low coefficient of friction material between the inner hub and the first outer hub; and positioning a second outer sleeve fabricated from low coefficient of friction material between the inner hub and the second outer hub.

Embodiments of the method may include when coupling the first outer hub and the second outer hub section further forming a slot in each end of the shaft portion, and for each of the first and second outer hubs, positioning a key in the slot of each end of the shaft and securing the key to its respective outer hub. At least one of securing the first feed screw to the first outer hub and securing the second feed screw to the second outer hub may include clamping the feed screw to the outer hub with upper and lower hubs.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
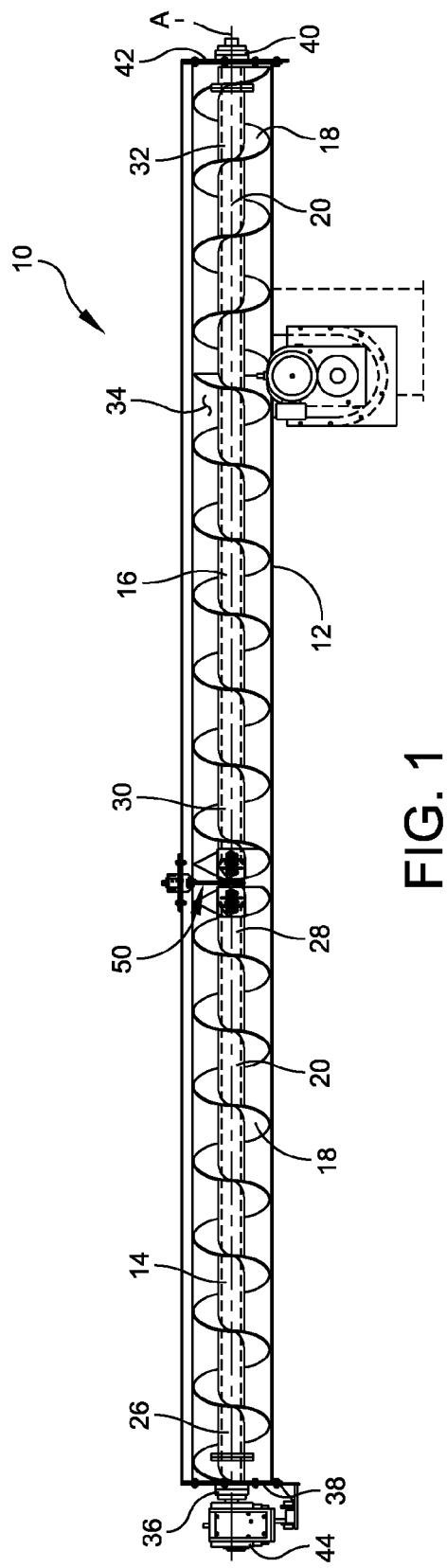
FIG. 1 is a cross-sectional view of a material recovery system having a feed screw conveyor used to transport material.

For the purposes of illustration only, and not to limit the generality, the present disclosure will now be described in detail with reference to the accompanying figures. This disclosure is not limited in its application to the details of construction and the arrangement of components set forth in the following description or illustrated in the drawings. The principles set forth in this disclosure are capable of other embodiments and of being practiced or carried out in various ways. Also the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

With surface preparation equipment, such as shot blast equipment, one or more screw conveyors are provided for transporting granular media, such as steel shot, grit, sand, and the like, to the equipment. One example of a screw conveyor includes a cylindrical casing or trough and one or more feed screws disposed within the casing or trough to transport the granular media within the casing or trough. The feed screw includes a thin plate screw blade that is secured, e.g., by welding, to a rotary shaft. A drive motor is provided at one end of the rotary shaft to drive the rotation of the feed screw. An inlet hopper is provided at one end of the screw conveyor into which granular media is supplied. At the other end of the screw conveyor an outlet is provided through which the material is discharged.

In applications requiring long screw conveyors, it is necessary to support the feed screws at axial positions along the length of the screw conveyor. Support hanger bearing assemblies are provided to support separate lengths of feed screws along the length of the screw conveyor. In one embodiment, each support hanger assembly includes a hanger bracket having a vertical support member coupled to the cylindrical casing or trough and an inner hub secured to and extending perpendicularly from the vertical support member. The support hanger assembly further includes a shaft portion disposed within the inner hub and an inner sleeve disposed between the shaft portion and the inner hub. The support hanger assembly further includes two outer hubs coupled to the shaft portion and two outer sleeves disposed between the inner hub and the respective outer hubs. In a certain embodiment, the inner and outer sleeves are fabricated from low coefficient of friction material, such as ultra-high molecular weight polyethylene material. Two feed screws are supported by the support hanger assembly in a manner such that a first feed screw is coupled to one of the outer hubs and a second feed screw is coupled to the other outer hub. The arrangement is such that the first feed screw, driven by the motor or by another similarly configured feed screw, drives the rotation of the second feed screw.

In a particular embodiment, in order to secure the outer hubs to their respective first and second feed screws, each outer hub includes a cylindrical portion and an annular end portion secured to an inner surface of the cylindrical portion. The annular end portions of the outer hubs engage respective opposite ends of the shaft portion. Each end of the shaft portion has a slot formed therein, which is configured to receive a key. The key is secured to the respective annular end portion of the outer hub section.

Figure 2:
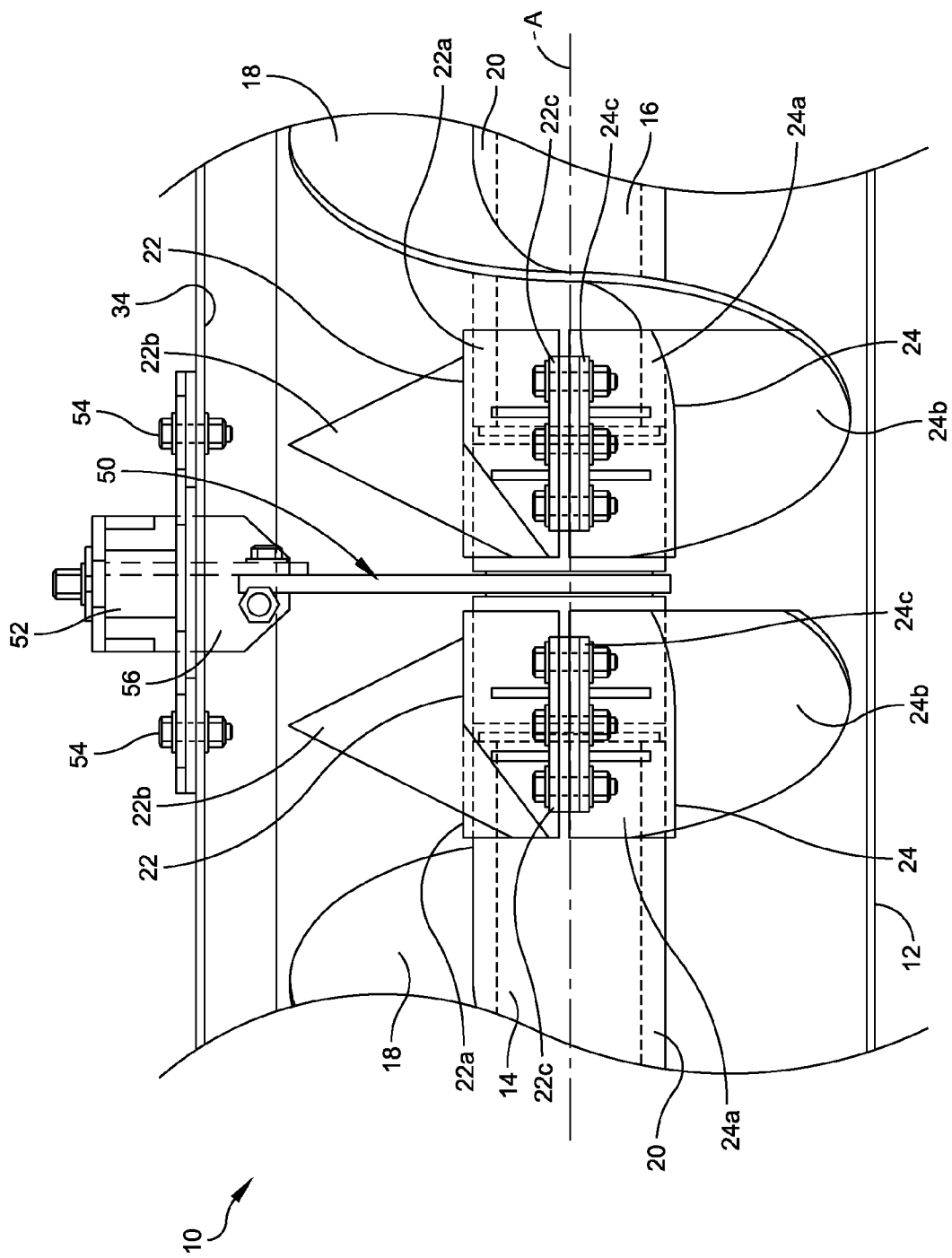
FIG. 2 is an enlarged cross-sectional view of a support hanger assembly used to support two feed screws of an embodiment of the present disclosure.

Referring now to the drawings, and more particularly to FIG. 1, there is generally indicated at 10 a screw conveyor of an embodiment of the present disclosure. As shown, the screw conveyor 10 extends along a longitudinal axis A and includes a cylindrical casing 12 and two feed screws 14, 16 disposed within the casing and in axial alignment with one another to transport the granular media within the casing. In one embodiment, each feed screw 14, 16 includes a thin plate screw blade 18 that is secured, e.g., by welding, to a rotary shaft 20. In a certain embodiment, the rotary shaft 20 is hollow or tubular in construction. As shown, feed screw 14 includes a left-hand end 26 (as shown in FIG. 1) and a right hand end 28. Similarly, feed screw 16 includes a left-hand end 30 and a right hand end 32. For each feed screw 14, 16, the screw blade 18 extends along the entire length of the feed screw. The screw blade 18 is in the form of a helix so that when rotating the rotary shaft 20 granular material is moved along the length of the screw conveyor by the screw blade in the direction of the helix of the screw blade. With the screw conveyor 10 illustrated in the drawing figures, material is configured to move from left to right. As shown in FIG. 2, an outer edge of the screw blade 18 of each feed screw 14, 16 nearly touches an inner surface 34 of the casing 12 but is sufficiently spaced apart from one another so as to not interfere with the rotation of the feed screw. Alternate embodiments may include replacing the casing 12 with a trough, such as the facet trough described above.

Provided at one end of the screw conveyor 10, e.g., the left-hand end illustrated in FIG. 1, the left-hand end 26 of the first feed screw 14 is supported by a bearing assembly 36, which is secured to an end 38 of the casing 12. Similarly, provided at the opposite end of the screw conveyor 10, e.g., the right-hand end illustrated in FIG. 1, the right-hand end 32 of the second feed screw 16 is supported by another bearing assembly 40, which is secured to an opposite end 42 of the casing 12. A drive motor 44, coupled to the bearing assembly 36 positioned at the left-hand end 38 of the casing 12, is provided to drive the rotation of the first feed screw 14. An inlet hopper (not shown) may be provided at one end of the screw conveyor into which granular media is supplied. At the other end of the screw conveyor 10 or anywhere along the length of the screw conveyor an outlet (not shown) may be provided through which the material is discharged. Although two feed screws 14, 16 are shown and described throughout the drawing figures, the screw conveyor 10 of embodiments of the disclosure may include any number of feed screws to convey media through the screw conveyor. It should be understood that the positions of the drive motor 44, the inlet hopper and the outlet may be selected based on the particular environment in which the screw conveyor 10 operates.

As described above, in applications requiring long screw conveyors, it is necessary to support the feed screws at axial positions along the length of the screw conveyor. Hanger bearing assemblies are provided to support separate lengths of feed screws along the length of the screw conveyor. In one embodiment, a hanger bearing assembly, generally indicated at 50, is provided to support and secure the right-hand end 28 of the first feed screw 14 and the left-hand end 30 of the second feed screw 16. The hanger bearing assembly 50 also enables the first feed screw 14 to drive the rotation of the second feed screw 16.

Figure 3:
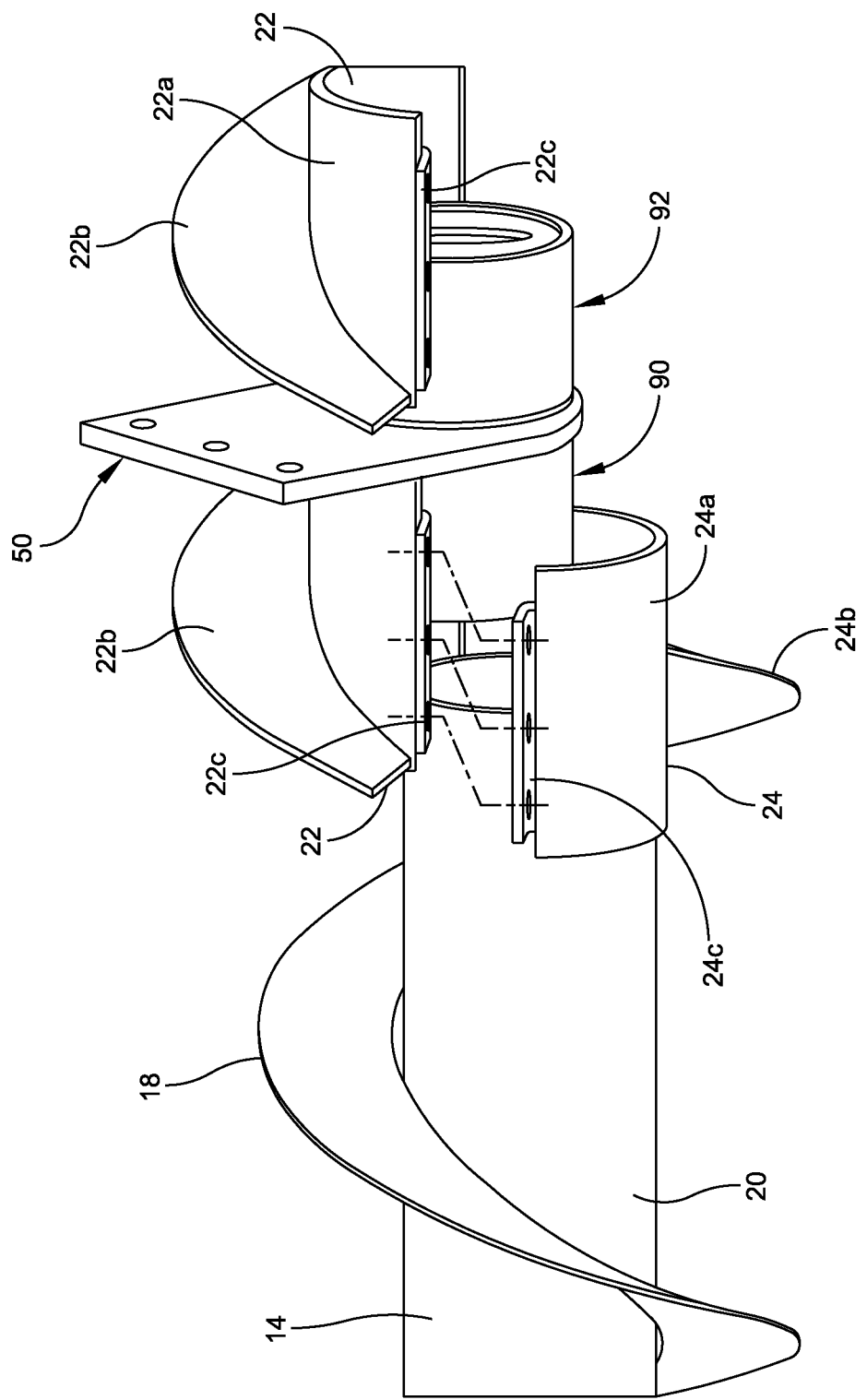
FIG. 3 is a partially exploded, enlarged perspective view of the support hanger assembly.

Referring to FIGS. 2 and 3, a support bracket 52 is secured to the casing 12 by suitable fasteners, each indicated at 54. As shown, a portion 56 of the bracket 52 extends into the interior of the casing 12 and is configured to support the hanger bearing assembly 50. The support bracket 52 positions the hanger bearing assembly 50 within the interior of the casing 12 so that the hanger bearing assembly supports the free ends 28, 30 of the first and second feed screws 14, 16, respectively, so that the feed screws extend along axis A. The hanger bearing assembly 50 is configured so that it can be used to support feed screws 14, 16 as described herein, or may be specifically adapted to support feed screws having differing structures. For each feed screw 14, 16, an upper hub 22 and a lower hub 24 are provided to secure the feed screw to the hanger bracket 50 in the manner described below.

With reference to FIG. 3, the upper hub 22 includes a semi-cylindrical hub portion 22*a*, a blade portion 22*b* that extends radially from the hub portion, and flange portions 22*c* that extend outwardly from the hub portion on opposite sides of the hub portion. The lower hub 24 includes a semi-cylindrical hub portion 24*a*, a blade portion 24*b* that extends radially from the hub portion, and flange portions 24*c* that extend outwardly from the hub portion on opposite sides of the hub portion. The arrangement is such that the flange portions 22*c*, 24*c* mate with one another in the manner illustrated by broken lines in FIG. 3 and may be secured to one another by one or more fasteners, such as nut-and-bolt screw fasteners. The result is that the upper and lower hubs 22, 24 are clamped onto the rotary shaft 20 of the feed screw (e.g., feed screw 14 in FIG. 3) to secure the rotary shaft with respect to the hubs. The rotary shaft 20 may also be welded to the hubs 22, 24. The blade portions 22*b*, 24*b* of the respective upper and lower hubs 22, 24 are arranged in a helix around their respective hub portions 22*a*, 24*a* so that the blade 18 of the left-hand feed screw 14 continuously extends to the blade 18 of the right-hand feed screw 16.

Figure 4:
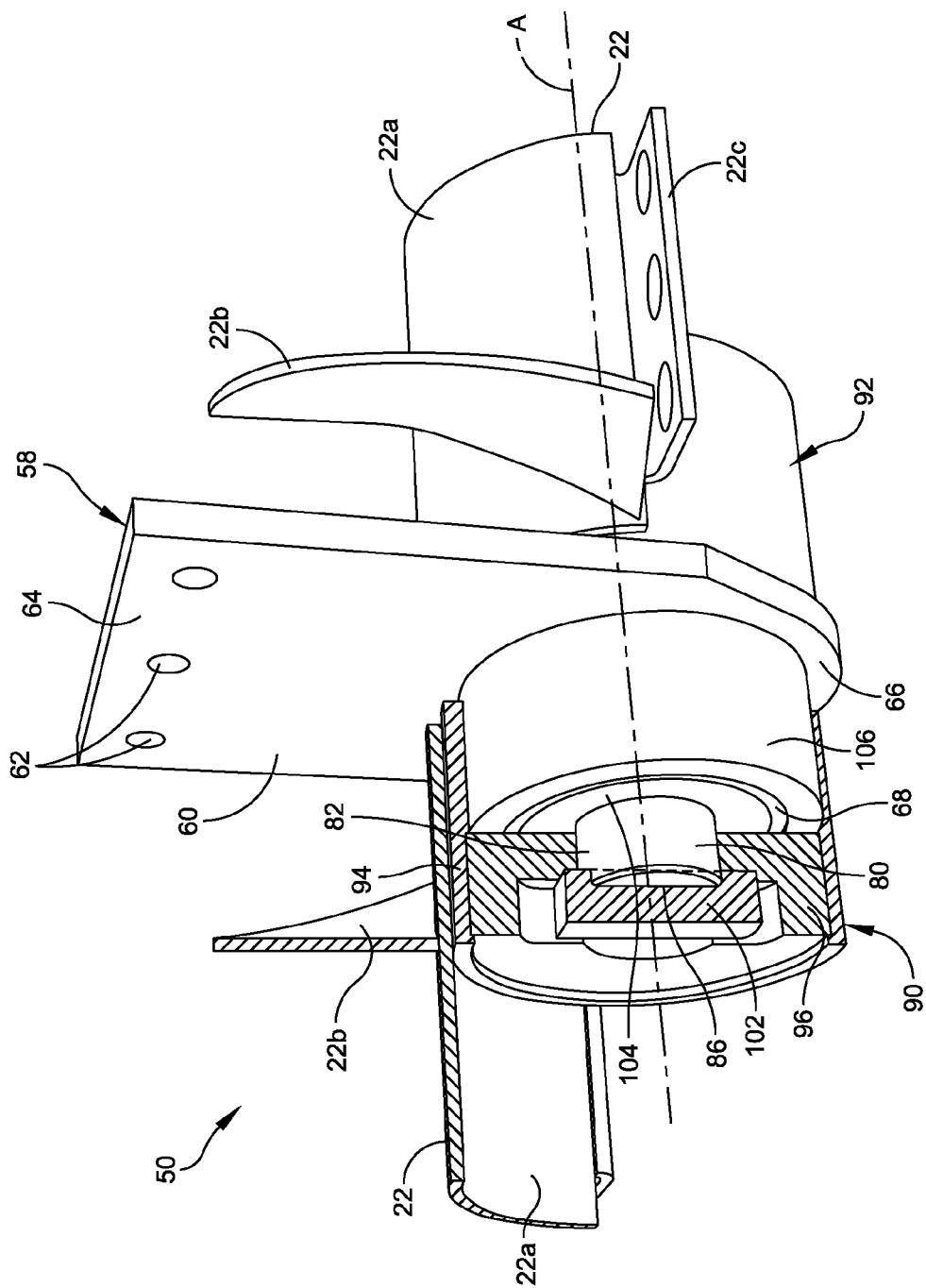
FIG. 4 is a partially sectioned, enlarged perspective view of the support hanger assembly.
Figure 5:
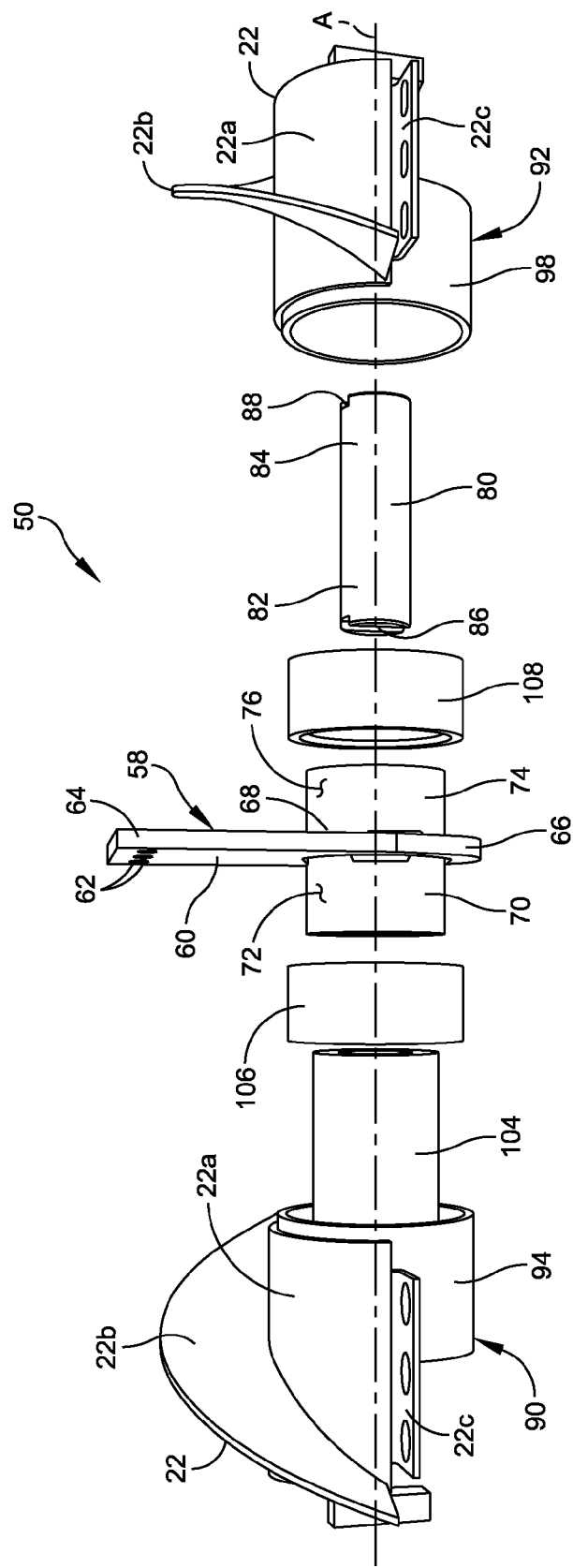
FIG. 5 is an exploded front perspective view of the support hanger assembly.
Figure 6:
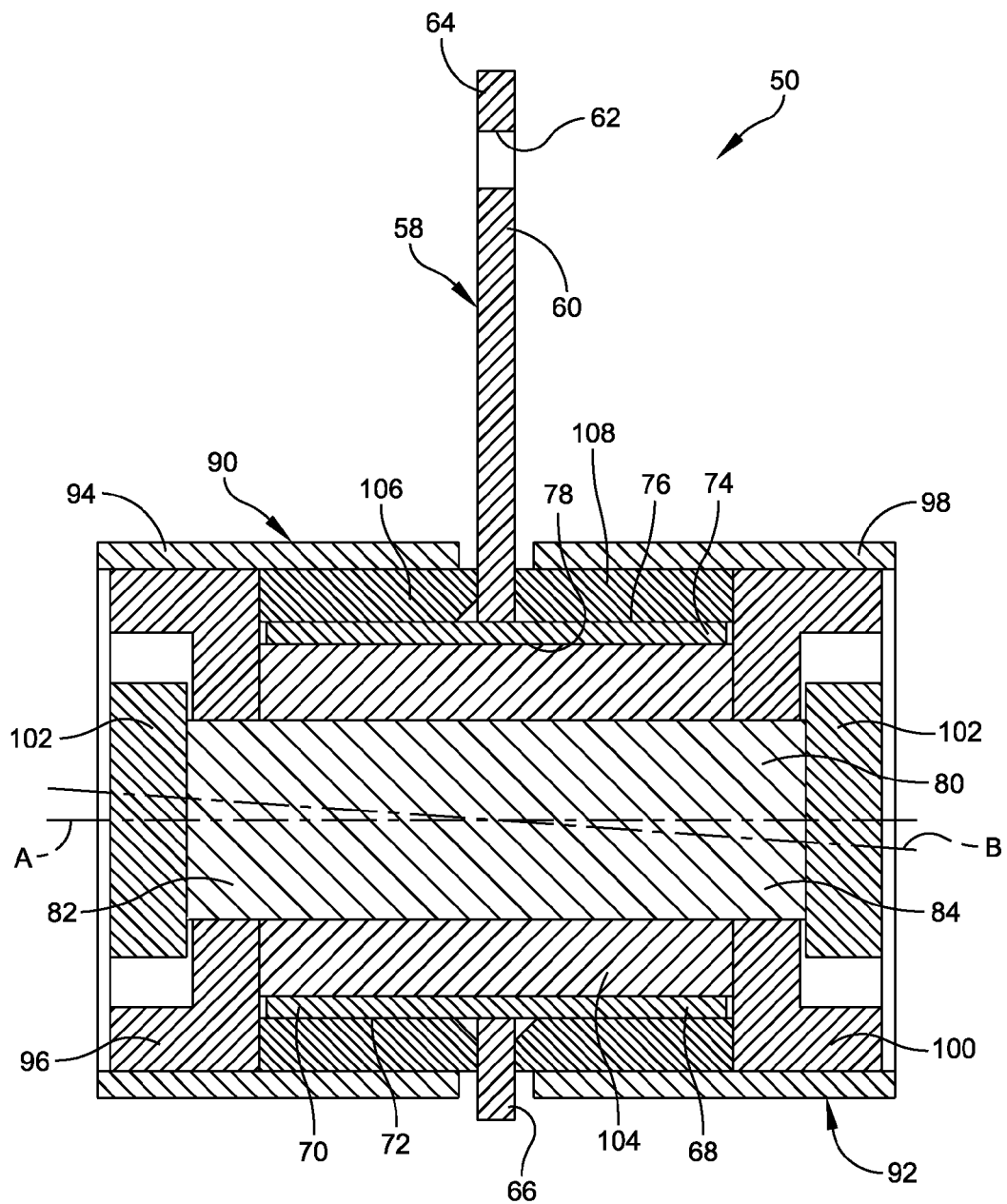
FIG. 6 is a cross-sectional view of the support hanger assembly.

Turning to FIGS. 4-6, the hanger bearing assembly 50 includes a hanger bracket, generally indicated at 58, which is configured to be attached to the support bracket 52. The hanger bracket 58 includes a vertical support member 60 that is fabricated from bar stock material, such as steel. As shown, the vertical support member 60 has a plurality of openings each indicated at 62 at an upper end 64 of the member 60 to secure the member to the support bracket 52 with fasteners, such as nut-and-bolt screw fasteners, or the like. The upper end 64 of the vertical support member 60 is rectangular-shaped and a lower end 66 of the member 60 is in the shape of a semi-circle.

The hanger bracket 58, at the lower end 66 of the vertical support member 60, further includes an inner hub 68, which is secured to and extends perpendicularly from the vertical support member along axis A. In one embodiment, the inner hub 68 is inserted into an opening (not designated) formed in the lower end 66 of the vertical support member 60 and securely attached to the vertical support member by welding. The inner hub 68 includes a left-hand portion 70 having an outer surface 72 and a right-hand portion 74 also having an outer surface 76. The inner hub 68 further includes a continuous inner surface 78 that defines a cylindrical bore. The left hand portion 70 (sometimes referred to as a first inner hub portion) and the right-hand portion 74 (sometimes referred to as a second inner hub portion) are aligned with one another to create the continuous inner surface 78 defining an axial bore that extends along axis A. The arrangement is such that the left-hand portion 70 extends from one side of the vertical support member 60 and the right-hand portion 74 extends from an opposite side of the vertical support member.

The hanger bearing assembly 50 further includes a cylindrical shaft portion 80 that is disposed within the inner hub 68. The shaft portion 80 includes a left-hand end 82 and a right hand end 84 as shown in the drawing figures. The left-hand end 82 of the shaft portion 80 includes a vertical slot 86 formed therein. Similarly, the right-hand end 84 of the shaft portion 80 includes a vertical slot 88. It should be understood that the slots 86, 88 may be oriented in any desired direction. The purpose of the slots 86, 88 at the respective ends 82, 84 of the shaft portion 80 will become apparent as the description of the hanger bearing assembly 50 proceeds.

The hanger bearing assembly 50 further includes two outer hubs, generally indicated at 90, 92 (sometimes referred to as first and second outer hubs), which are secured to the shaft portion 80 at respective opposite ends 82, 84 of the shaft portion and to respective feed screws 14, 16 by the upper and lower hubs 22, 24. As best illustrated in FIG. 6, the left-hand outer hub 90 includes a cylindrical portion 94 and an annular end portion 96 secured to the cylindrical portion. Similarly, the right-hand outer hub 92 includes a cylindrical portion 98 and an annular end portion 100 secured to the cylindrical portion. Each cylindrical portion 94, 98 of the left-hand outer hub 90 and the right-hand outer hub 92, respectively, includes an outer surface and an inner surface (both not designated) on which the respective annular end portion 96, 100 is secured at an outer end of the cylindrical portion. Each annular end portion 96, 100 includes a first segment secured to the inner surface of the cylindrical portion and a second segment extending perpendicularly from the first portion toward the shaft portion. An inner surface of the second segment is secured to the shaft portion 80, as by welding. Each of the first and second outer hubs 90, 92 includes a key, each indicated at 102, configured to be received in the respective slot 86, 88 and secured to the respective annular end portion 96, 100, as by welding as well. For each of the left-hand outer hub 90 and the right-hand outer hub 92, the key 102 secures the outer hub to the respective end 82, 84 of the shaft portion 80.

The left-hand feed screw 14 is secured to the first outer hub 90 of the bearing assembly 50 by clamping the upper and lower hubs 22, 24 around the rotary shaft 20 of the feed screw and the outer surface of the first outer hub. FIG. 3 illustrates the left-hand upper and lower hubs 22, 24 prior to being clamped onto the end of the rotary shaft 20 of the feed screw 14 and the first outer hub 90 by suitable fasteners. It should be noted that the upper and lower hubs 22, 24 may also be secured to the rotary shaft 20 and the first outer hub 90 by welding, either in place of or in addition to clamping. Similarly, the right-hand feed screw 16 is secured to the second outer hub 92 of the bearing assembly 50 by clamping the upper and lower hubs 22, 24 around the rotary shaft of the feed screw and the outer surface of the second outer hub. The arrangement is such that the shaft portion 80 and the first and second outer hubs 90, 92 rotate as one unit with respect to and around the inner hub 68. Specifically, when a rotating force is applied to the left-hand or first outer hub 90 by the feed screw 14, the rotating force is applied to the right-hand or second outer hub 92 by the shaft portion 80 so that the second outer hub rotates with the first outer hub. Thus, the left-hand feed screw 14 is capable of driving the rotation of the right-hand feed screw 16 when the left-hand feed screw is driven by the drive motor 44.

To prevent wear between the rotatable first and second outer hubs 90, 92 and the shaft portion 80 and the rotatably fixed inner hub 68, an inner sleeve 104 is disposed between the shaft portion and the inner hub and two outer sleeves 106, 108 (sometimes referred to as the left-hand or first outer sleeve 106 and the right-hand or second outer sleeve 108) are disposed between the inner hub and respective first and second outer hubs. The inner sleeve 104 and the first and second outer sleeves 106, 108 are loosely toleranced with respect to their respective inner hub 68, shaft portion 80 and left-hand and right-hand outer hubs 90, 92, and may be fabricated from low coefficient of friction material. For example, the inner sleeve 104 and the first and second outer sleeves 106, 108 may be fabricated from ultra-high molecular weight polyethylene material. However, any suitable material may be provided so long as the sleeves 104, 106, 108 are designed to enable the rotation of the first and second outer hubs 90, 92 and the shaft portion 80 with respect to the inner hub 68 while enabling a reasonable amount of misalignment and feed screw wobble. As shown in FIG. 6, a certain amount of misalignment between the left-hand feed screw 14 and the right-hand feed screw 16 is represented by axis B.

Figure 7:
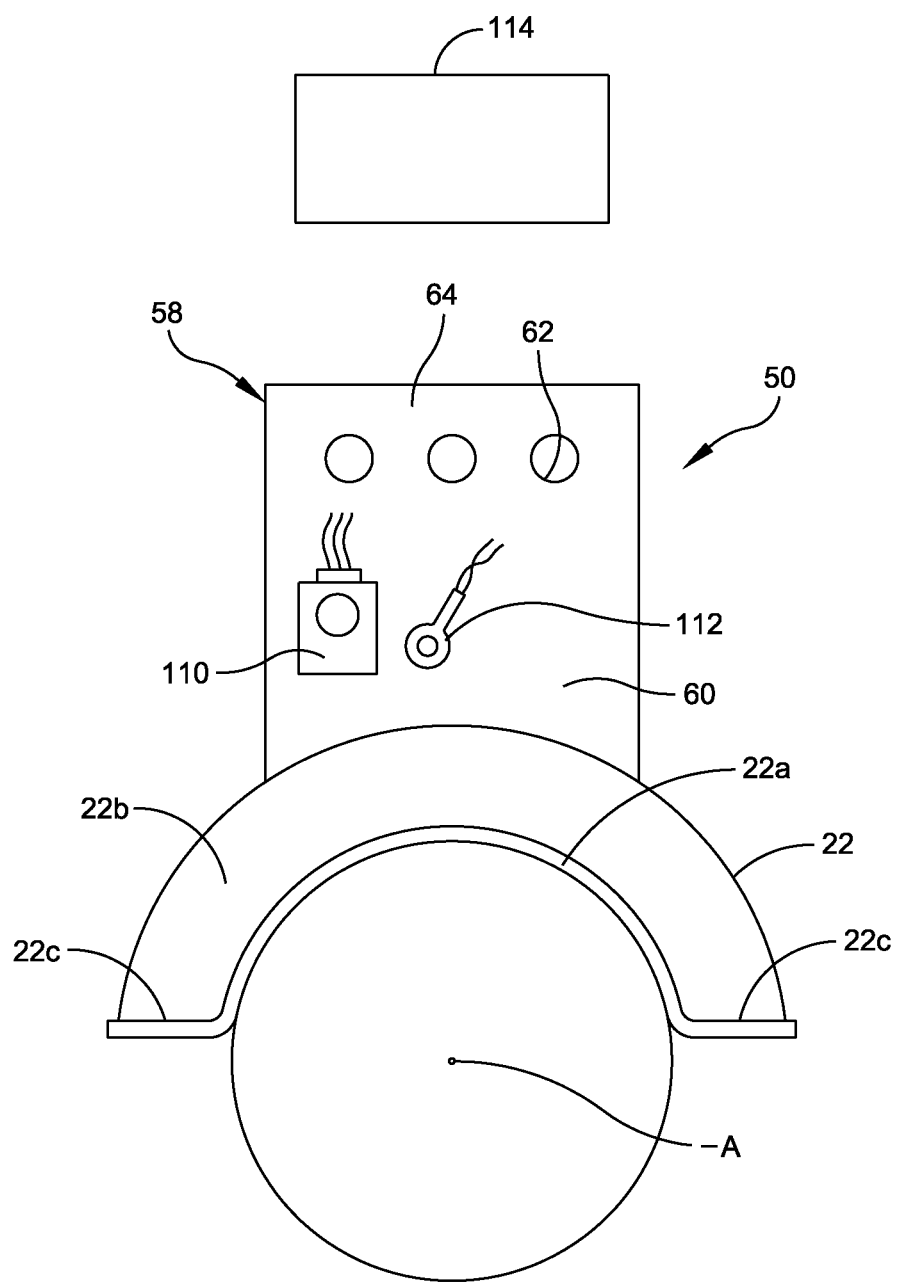
FIG. 7 is an end view of the support hanger assembly.

Turning to FIG. 7, the upper half of the right-hand feed screw 14 is illustrated schematically to show the attachment to the support hanger assembly 50. As shown, the vertical support member 60 of the hanger bracket 58 includes a vibration sensor 110 to measure or otherwise obtain vibration being absorbed by the support hanger assembly 50. The vertical support member 60 of the hanger bracket 58 further includes a temperature sensor 112 to measure the temperature of the support hanger assembly 50. The data obtained by the vibration sensor 110 and the temperature sensor 112 may be transmitted to a controller 114, which controls the operation of the screw conveyor 10 and other components of the system. The controller 114 may be directly coupled to the vibration sensor and the temperature sensor 112, and any other component of the screw conveyor 10 or communicate with these components through a network.

A method for supporting two feed screws of a screw conveyor mechanism is further disclosed herein. In one embodiment, the method comprises securing a hanger bracket to a support structure. The hanger bracket has a vertical support member and an inner hub secured to and extending perpendicularly from the vertical support member. The method further comprises securing a first feed screw to a first outer hub and securing a second feed screw to a second outer hub. The first outer hub and the second outer hub are coupled to a shaft portion disposed within the inner hub of the hanger bracket. As described herein an inner sleeve is positioned between the shaft portion and the inner hub. A first outer sleeve is positioned between the inner hub and the first outer hub. Similarly, a second outer sleeve is positioned between the inner hub and the second outer hub. In a certain embodiment, the inner sleeve and the first and second outer sleeves are fabricated from low coefficient of friction material, such as ultra-high molecular weight polyethylene material. To assist in securing the first and second outer hubs to the shaft portion, the first outer hub and the second outer hub section further includes forming a slot in each end of the shaft portion. Further, for each of the first and second outer hubs, a key is positioned in the slot of each end of the shaft and secured to its respective outer hub.

Thus, it should be observed that the support hanger assembly of embodiments of the present disclosure is capable of operating under high-stress conditions. The inner sleeve and the outer sleeves provide bearing surfaces to enable the free rotation of the first outer hub, the shaft portion and the second outer hub with respect to the inner hub. The tolerances of the inner sleeve and the outer sleeves are relatively loose to enable the rigid components (e.g., the shaft portion, the inner hub and the outer hubs) to float in between the sleeves. The provision of the inner sleeve and the outer sleeves enable the left-hand feed screw to be misaligned with respect to the right-hand feed screw. Since the support hanger assembly does not include a bearing the support hanger assembly can operate even when the inner sleeve and the outer sleeves are completely worn. The design of the support hanger assembly enables on support hanger assembly to be easily interchanged with another support hanger assembly. In addition, lateral loads are easily transferred by the shaft portion from the left hand feed screw to the right-hand feed screw.

The component parts of the screw conveyor 10, in some embodiments, are fabricated from sheet metal, such as stainless steel. The components may be secured to one another by any suitable manner, such as by welding or by use of fasteners.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A screw conveyor for moving granular media, the screw conveyor comprising:
    a first feed screw including a first end portion;
    a second feed screw including a second end portion;
    a support hanger assembly configured to support the first feed screw and the second feed screw at the respective first and second end portions of the first feed screw and the second feed screw, the support hanger assembly including
        a hanger bracket having a vertical support member and an inner hub secured to and extending perpendicularly from the vertical support member,
        a shaft portion disposed within the inner hub,
        an inner sleeve fabricated from low coefficient of friction material, the inner sleeve being configured to be disposed between the shaft portion and the inner hub, and
        an outer hub assembly coupled to the shaft portion,
    wherein the first feed screw and the second feed screw are coupled to the outer hub assembly; and
    an upper hub and a lower hub configured to couple one of the first end portion of the first feed screw and the second end portion of the second feed screw to the outer hub assembly.

2. The screw conveyor of claim 1, wherein the outer hub assembly includes a first outer hub and a second outer hub.

3. The screw conveyor of claim 2, wherein each of the first and second outer hubs includes an outer sleeve fabricated from low coefficient of friction material, the outer sleeve being configured to be disposed between the inner hub and the outer hub.

4. The screw conveyor of claim 3, wherein each of the first and second outer hubs further includes a cylindrical portion and an annular end portion secured to an inner surface of the cylindrical portion, the annular end portions of the first and second outer hubs engaging opposite ends of the shaft portion.

5. The screw conveyor of claim 4, wherein each end of the shaft portion has a slot formed therein, and wherein each of the first and second outer hubs includes a key configured to be received in the slot and secured to the respective annular end portion.

6. The screw conveyor of claim 3, wherein the outer sleeve includes a first outer sleeve section configured to be disposed between the inner hub and the first outer hub and a second outer sleeve section configured to be disposed between the inner hub and the second outer hub.

7. The screw conveyor of claim 3, wherein the inner and outer sleeves are fabricated from ultra-high molecular weight polyethylene material.

8. The screw conveyor of claim 1, wherein the inner hub includes a first inner hub portion extending from one side of the vertical support member and a second inner hub portion extending from an opposite side of the vertical support member, and wherein the first inner hub portion and the second inner hub portion are aligned with one another to create a continuous inner surface defining an axial bore.

9. A support hanger assembly configured to support first and second feed screws of a screw conveyor mechanism, the support hanger assembly comprising:
    a hanger bracket having a vertical support member and an inner hub secured to and extending perpendicularly from the vertical support member;
    a shaft portion disposed within the inner hub;
    an inner sleeve fabricated from low coefficient of friction material, the inner sleeve being configured to be disposed between the shaft portion and the inner hub;
    an outer hub assembly coupled to the shaft portion,
    wherein the outer hub assembly is configured to be secured to the first feed screw and the second feed screw of the screw conveyor mechanism; and
    an upper hub and a lower hub configured to couple one of the first end portion of the first feed screw and the second end portion of the second feed screw to the outer hub assembly.

10. The support hanger assembly of claim 9, wherein the outer hub assembly includes a first outer hub and a second outer hub.

11. The support hanger assembly of claim 10, wherein each of the first and second outer hubs includes an outer sleeve fabricated from low coefficient of friction material, the outer sleeve being configured to be disposed between the inner hub and the outer hub.

12. The support hanger assembly of claim 11, wherein each of the first and second outer hubs further includes a cylindrical portion and an annular end portion secured to an inner surface of the cylindrical portion, the annular end portions of the first and second outer hubs engaging opposite ends of the shaft portion.

13. The support hanger assembly of claim 12, wherein each end of the shaft portion has a slot formed therein, and wherein each of the first and second outer hubs includes a key configured to be received in the slot and secured to the respective annular end portion.

14. The support hanger assembly of claim 11, wherein the outer sleeve includes a first outer sleeve section configured to be disposed between the inner hub and the first outer hub and a second outer sleeve section configured to be disposed between the inner hub and the second outer hub.

15. The support hanger assembly of claim 11, wherein the inner and outer sleeves are fabricated from ultra-high molecular weight polyethylene material.

16. The support hanger assembly of claim 9, wherein the inner hub includes a first inner hub portion extending from one side of the vertical support member and a second inner hub portion extending from an opposite side of the vertical support member, and wherein the first inner hub portion and the second inner hub portion are aligned with one another to create a continuous inner surface defining an axial bore.

17. A method of supporting two feed screws of a screw conveyor mechanism, the method comprising:
    securing a hanger bracket to a support structure, the hanger bracket having a vertical support member and an inner hub secured to and extending perpendicularly from the vertical support member;
    securing a first feed screw to a first outer hub;
    securing a second feed screw to a second outer hub;
    coupling the first outer hub and the second outer hub to a shaft portion disposed within the inner hub of the hanger bracket;
    positioning an inner sleeve fabricated from low coefficient of friction material between the shaft portion and the inner hub; and
    securing an upper hub and a lower hub to the shaft portion.

18. The method of claim 17, further comprising positioning a first outer sleeve fabricated from low coefficient of friction material between the inner hub and the first outer hub, and positioning a second outer sleeve fabricated from low coefficient of friction material between the inner hub and the second outer hub.

19. The method of claim 17, wherein coupling the first outer hub and the second outer hub section further includes forming a slot in each end of the shaft portion, and for each of the first and second outer hubs, positioning a key in the slot of each end of the shaft and securing the key to its respective outer hub.

* * * * *